(12) United States Patent
Li et al.

(10) Patent No.: US 12,541,352 B2
(45) Date of Patent: Feb. 3, 2026

(54) CONTROLLING INSTALLATION OF DRIVERS BASED ON HARDWARE AND SOFTWARE COMPONENTS PRESENT ON INFORMATION TECHNOLOGY ASSETS

(71) Applicant: Dell Products L.P., Round Rock, TX (US)

(72) Inventors: John Li, Austin, TX (US); Ashutosh Singh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 371 days.

(21) Appl. No.: 18/121,910

(22) Filed: Mar. 15, 2023

(65) Prior Publication Data

US 2024/0311116 A1    Sep. 19, 2024

(51) Int. Cl.
  *G06F 8/61* (2018.01)

(52) U.S. Cl.
  CPC ........................ *G06F 8/61* (2013.01)

(58) Field of Classification Search
  CPC ............ G06F 8/60–66; G06F 11/3051; H04L 41/085–0873
  See application file for complete search history.

(56) References Cited

U.S. PATENT DOCUMENTS

| | | | | |
|---|---|---|---|---|
| 8,533,537 | B2 * | 9/2013 | Nemecek | G06F 11/008 714/49 |
| 9,229,902 | B1 * | 1/2016 | Leis | H04L 41/082 |
| 10,079,715 | B1 * | 9/2018 | Nandyalam | H04L 67/02 |
| 10,732,957 | B2 * | 8/2020 | Dattatri | G06F 8/65 |
| 10,789,057 | B2 * | 9/2020 | Vichare | G06F 8/60 |

(Continued)

OTHER PUBLICATIONS

Mccaffrey, J., "Data Prep for Machine Learning: Encoding", Visual Studio Magazine [online], 2020 [retrieved Apr. 18, 2025], Retrieved from Internet: <URL: https://visualstudiomagazine.com/articles/2020/08/12/ml-data-prep-encoding.aspx>, whole document.*

(Continued)

*Primary Examiner* — Todd Aguilera
(74) *Attorney, Agent, or Firm* — Ryan, Mason & Lewis, LLP

(57) ABSTRACT

An apparatus comprises a processing device configured to obtain monitoring data characterizing presence of hardware and software components on information technology assets, to generate a state map characterizing which of the hardware and software components were present on each information technology asset when installation of a given driver was attempted and whether the installation of the given driver was successful. The processing device is also configured to determine, based on the state map, conditional probabilities of installation failure for the given driver associated with presence of respective ones of the hardware and software components, to identify hardware and software components present on an additional information technology asset, and to control whether the given driver is installed on the additional information technology asset based on the conditional probabilities of installation failure for the given driver associated with the identified hardware and software components present on the additional information technology asset.

20 Claims, 16 Drawing Sheets

(56) References Cited

U.S. PATENT DOCUMENTS

| | | | | |
|---|---|---|---|---|
| 11,029,938 | B1* | 6/2021 | Sethi | G06F 9/451 |
| 11,144,302 | B2* | 10/2021 | Arakkal | G06N 20/00 |
| 11,748,086 | B2* | 9/2023 | Sethi | G06F 11/1433 |
| | | | | 717/168 |
| 11,886,296 | B2* | 1/2024 | Chen | G06F 11/008 |
| 2011/0283146 | A1* | 11/2011 | Nemecek | G06F 11/008 |
| | | | | 714/37 |
| 2021/0132936 | A1* | 5/2021 | Arakkal | G06N 7/01 |
| 2022/0138068 | A1* | 5/2022 | Dal Zotto | G06F 11/302 |
| | | | | 714/47.1 |

OTHER PUBLICATIONS

G. James et al., "An Introduction to Statistical Learning with Applications in R," Springer Texts in Statistics, Second Edition, Aug. 4, 2021, 612 pages.

Scikit-Learn Developers, "Naive Bayes," https://scikit-learn.org/stable/modules/naive_bayes.html#bernoulli-naive-bayes, Accessed Mar. 14, 2023, 3 pages.

D. D. Lewis, "Naive Bayes at Forty: The Independence Assumption in Information Retrieval," Proceedings of the 10th European Conference on Machine Learning, Apr. 1998, pp. 4-15.

A. McCallum et al., "A Comparison of Event Models for Naive Bayes Text Classification," Fifteenth National Conference on Artificial Intelligence, Jul. 1998, 8 pages.

Dell EMC, "SupportAssist for Enterprise Systems," Rev. 1.1, Jan. 2016, 2 pages.

Dell Inc., "Dell SupportAssist Agent User's Guide," Rev. A00, Feb. 2015, 15 pages.

"Chain Rule," https://eecs.qmul.ac.uk/~norman/BBNs/Chain_rule.htm, Accessed Mar. 14, 2023, 1 page.

Dell Inc., "Dell Command: Update," Version 4.x Reference Guide, Rev. A06, Jan. 2023, 22 pages.

K. P. Murphy, "Machine Learning: A Probabilistic Perspective," The MIT Press, 2012, 1098 pages.

Dell Technologies, "SupportAssist for Home PCs Version 3.13.0," User's Guide, Rev. A00, Dec. 2022, 51 pages.

* cited by examiner

| VARIABLE DRIVER INSTALLATION FAILURE RATE BY PLATFORM |||||| 
|---|---|---|---|---|---|
| DRIVER ID | PLATFORM | INSTALLATION COUNT | FAILURE COUNT | FAIL RATE (%) | REVISION DATE |
| ABCDE | PLATFORM1 | 10696 | 436 | 4.08 | 11/9/2020 |
| ABCDE | PLATFORM2 | 151 | 80 | 52.98 | 11/9/2020 |
| FGHI | PLATFORM3 | 280 | 256 | 91.43 | 10/4/2021 |
| FGHI | PLATFORM4 | 187 | 17 | 9.09 | 10/4/2021 |

FIG. 6

| STATE MAP ||||||
|---|---|---|---|---|---|
| TIME OF INTEREST (DRIVER INSTALL FAILURE) | TIME OF NEAREST PRIOR COLLECTION (HARDWARE) | TIME OF NEAREST PRIOR COLLECTION (SOFTWARE) | SERVICE TAG | HARDWARE STATE | SOFTWARE STATE |
| DAY 1, HOUR 06 | DAY 1, HOUR 01 | DAY 1, HOUR 04 | ABCDEFG | [HW I, HW N] | [SW1, DR1] |
| DAY 1, HOUR 14 | DAY 1, HOUR 12 | DAY 1, HOUR 10 | ABCDEFG | [HW I, HW A] | [SW1, SW2, DR1] |
| DAY 8, HOUR 03 | DAY 8, HOUR 01 | DAY 7, HOUR 01 | UVWXYZ1 | [HW I, HW K] | [SW9, DR2 VER A] |
| DAY 9, HOUR 05 | DAY 8, HOUR 12 | DAY 9, HOUR 04 | UVWXYZ1 | [HW I, HW K] | [SW9, DR2 VER C] |

FIG. 8C

| SUPPORT INFORMATION DATA VAULT ||||| 
|---|---|---|---|---|
| SYSTEM TYPE | MOTHERBOARD PIECE PART IDENTIFIER (PPID) | BIOS VERSION | PROCESSOR INFORMATION | VIDEO CONTROLLER |
| DESKTOP(3) | ABCDWXYZ | 2.0.6 | MODEL , VERSION 1, 2.90GHz, 8-CORE [16 LOGICAL PROCESSORS] | GRAPHICS CARD TYPE 1 |
| DESKTOP(16) | EFGHSTUV | A29 | MODEL B, VERSION 1, 3.10GHz, 4-CORE [4 LOGICAL PROCESSORS] | GRAPHICS CARD TYPE2 |
| LAPTOP(10) | IJKLPQRS | 1.11.0 | MODEL B, VERSION 2, 1.60GHz, 4-CORE [8 LOGICAL PROCESSORS] | GRAPHICS CARD TYPE 3 |
| LAPTOP(10) | MNOPABCD | 1.2.0 | MODEL C, VERSION 1, 1.20GHz, 2-CORE [4 LOGICAL PROCESSORS] | GRAPHICS CARD TYPE 3 |
| DESKTOP(3) | QRSTEFGH | 2.0.10 | MODEL B, VERSION 3, 2.90GHz, 6-CORE [12 LOGICAL PROCESSORS] | GRAPHICS CARD TYPE 1 |
| LAPTOP(10) | UVWXIJKL | 1.22.1 | MODEL A, VERSION 2, 2.80GHz, 4-CORE [8 LOGICAL PROCESSORS] | GRAPHICS CARD TYPE 4 |
| LAPTOP(31) | YZABMNOP | 1.2.0 | MODEL A, VERSION 3, 2.80GHz, 4-CORE [8 LOGICAL PROCESSORS] | GRAPHICS CARD TYPE 5 |
| DESKTOP(3) | CDEFQRST | 1.8.0 | MODEL A, VERSION 4, 3.20GHz, 6-CORE [12 LOGICAL PROCESSORS] | GRAPHICS CARD TYPE 6 |

FIG. 9A

ASSET STATE MAP SNAPSHOT
905

| FEATURES | | | | | LABEL |
|---|---|---|---|---|---|
| TIMESTAMP | SERVICE TAG | DRIVER ID | PLATFORM | OS VERSION | STATE |
| TIMESTAMP1 | ABCDEFGH | 12345 | LAPTOP MODEL A | OS1 | AUTO INSTALL SUCCESSFUL |

| DRIVER NAME LIST |
|---|
| DRIVER1 |
| DRIVER2 |
| DRIVER3 |
| DRIVER4 |
| ... |

| APPLICATION NAME LIST |
|---|
| APPLICATION1 |
| APPLICATION2 |
| APPLICATION3 |
| APPLICATION4 |
| ... |

910

| TARGET DRIVER ID | MODEL PERFORMANCE SCORE (AREA UNDER THE RECEIVER OPERATING CHARACTERISTIC CURVE (AUROC)) |
|---|---|
| | MODEL PREDICTIVE POWER BY DRIVER |
| DRIVER A | 0.67285 |
| DRIVER B | 0.74228 |
| DRIVER C | 0.90701 |
| DRIVER D | 0.70253 |
| DRIVER E | 0.60452 |

FIG. 9C

CONTROLLING INSTALLATION OF DRIVERS BASED ON HARDWARE AND SOFTWARE COMPONENTS PRESENT ON INFORMATION TECHNOLOGY ASSETS

FIELD

The field relates generally to information processing, and more particularly to management of information processing systems.

BACKGROUND

As the value and use of information continues to increase, individuals and businesses seek additional ways to process and store information. Information handling systems and other types of information processing systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems.

SUMMARY

Illustrative embodiments of the present disclosure provide techniques for controlling installation of drivers based on hardware and software components present on information technology assets.

In one embodiment, an apparatus comprises at least one processing device comprising a processor coupled to a memory. The at least one processing device is configured to obtain monitoring data characterizing presence of hardware and software components on each of a plurality of information technology assets, to generate a state map characterizing (i) which of the hardware and software components were present on each of the plurality of information technology assets when installation of a given driver was attempted and (ii) whether installation of the given driver was successful on each of the plurality of information technology assets, and to determine, based at least in part on the state map, conditional probabilities of installation failure for the given driver associated with the presence of respective ones of the hardware and software components. The at least one processing device is also configured to identify hardware and software components present on an additional information technology asset, and to control whether the given driver is installed on the additional information technology asset based at least in part on the conditional probabilities of installation failure for the given driver associated with the identified hardware and software components present on the additional information technology asset.

These and other illustrative embodiments include, without limitation, methods, apparatus, networks, systems and processor-readable storage media.

BRIEF DESCRIPTION OF THE DRAWINGS

FIG. 6 shows a table illustrating variable driver installation failure rate by platform in an illustrative embodiment.

FIGS. 8A-8C show tables of hardware telemetry data, software telemetry data, and a state map created from the hardware and software telemetry data in an illustrative embodiment.

FIGS. 9A-9D shows tables of a collected data set for different information technology assets, a state map created for an information technology asset, model predictive power by driver, and root cause analysis of failure probabilities for different components in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
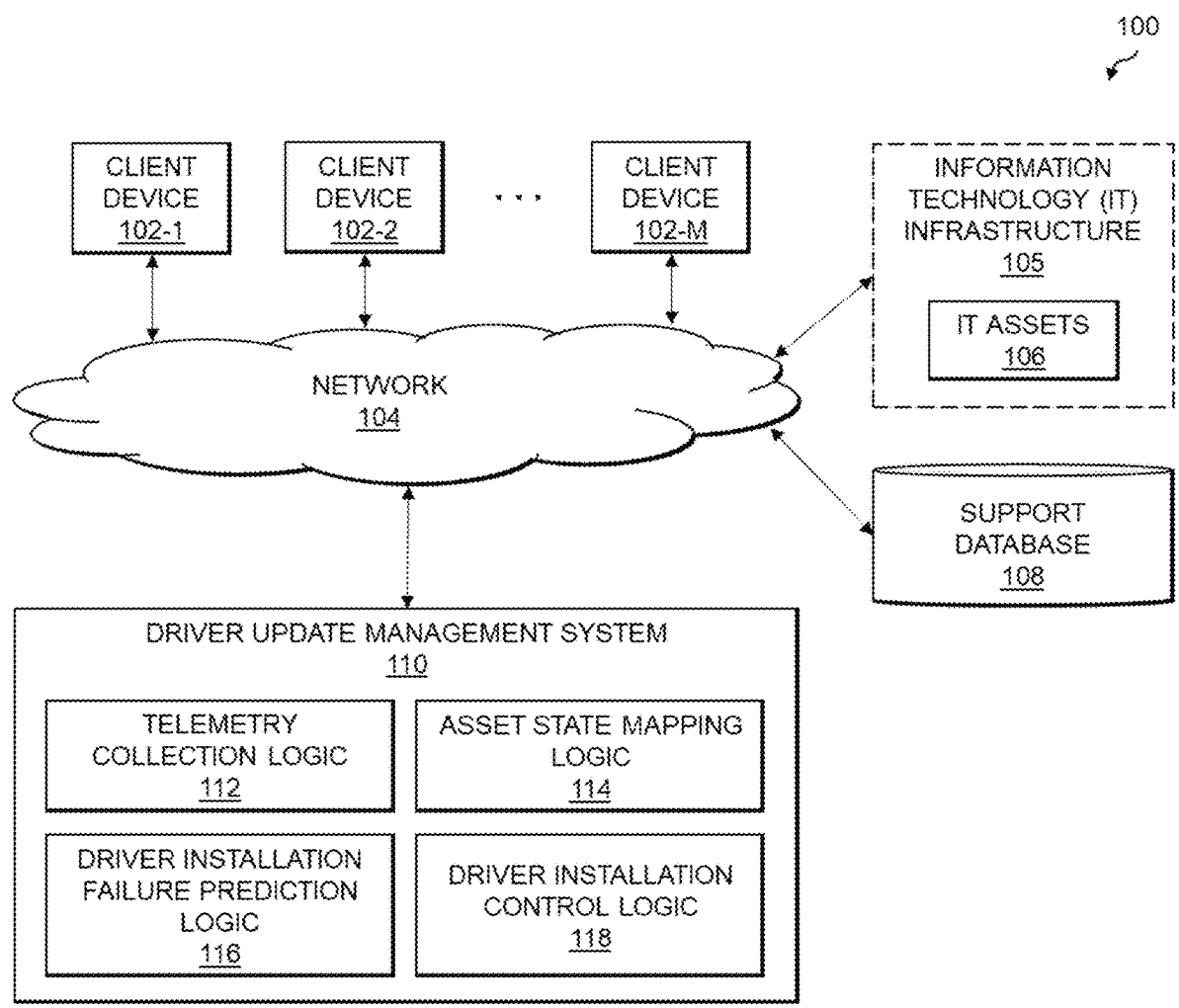
FIG. 1 is a block diagram of an information processing system configured for controlling installation of drivers based on hardware and software components present on information technology assets in an illustrative embodiment.

FIG. 1 shows an information processing system 100 configured in accordance with an illustrative embodiment. The information processing system 100 is assumed to be built on at least one processing platform and provides functionality for controlling installation of drivers based on hardware and software components present on information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a support database 108, and a driver update management system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the driver update management system 110 is used for an enterprise system. For example, an enterprise may subscribe to or otherwise utilize the driver update management system 110 for managing its assets (e.g., IT assets 106 in the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities). In other embodiments, the driver update management system 110 may be operated by an enterprise that is a hardware or software vendor of assets (e.g., IT assets 106 in the IT infrastructure 105, the client devices 102).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The support database 108 is configured to store and record various information that is utilized by the driver update management system 110 for proactively determining whether driver updates for ones of the IT assets 106 (and possibly ones of the client device 102) are likely to result in failure. The support database 108, for example, may store telemetry data collected from hardware and/or software components of the IT assets 106 (and possibly ones of the client devices 102), asset state maps, driver-wise classification models, etc. as will be described in further detail below. In some embodiments, one or more of the storage systems utilized to implement the support database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the driver update management system 110, as well as to support communication between the driver update management system 110 and other related systems and devices not explicitly shown.

In some embodiments, the client devices 102 are assumed to be associated with system administrators, IT managers or other authorized personnel responsible for managing the IT assets 106 of the IT infrastructure 105. For example, a given one of the client devices 102 may be operated by a user to access a graphical user interface (GUI) provided by the driver update management system 110 to manage one or more of the IT assets 106 of the IT infrastructure 105. The driver update management system 110 may be provided as a cloud service that is accessible by the given client device 102 to allow the user thereof to manage one or more of the IT assets 106 of the IT infrastructure 105 (e.g., including driver installation processes for such IT assets 106). In some embodiments, the IT assets 106 of the IT infrastructure 105 are owned or operated by the same enterprise that operates the driver update management system 110 (e.g., where an enterprise such as a business provides support for the assets it operates). In other embodiments, the IT assets 106 of the IT infrastructure 105 may be owned or operated by one or more enterprises different than the enterprise which operates the driver update management system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding their current state (e.g., hardware telemetry data, software telemetry data, installed drivers, operating systems (OSes), applications, etc.) which may be used for determining whether to install particular driver updates for different ones of the client devices 102 and/or the IT assets 106. The host agents may also be configured to receive, from the driver update management system 110, instructions for whether to install particular drivers on different ones of the client devices 102 and/or the IT assets 106. It should be noted that a "host agent" as this term is generally used herein may comprise an automated entity, such as a software entity running on a processing device. Accordingly, a host agent need not be a human entity.

The driver update management system 110 in the FIG. 1 embodiment is assumed to be implemented using at least one processing device. Each such processing device generally comprises at least one processor and an associated memory, and implements one or more functional modules or logic for controlling certain features of the driver update management system 110. In the FIG. 1 embodiment, the driver update management system 110 implements telemetry collection logic 112, asset state mapping logic 114, driver installation failure prediction logic 116, and driver installation control logic 118. The telemetry collection logic 112 is configured to obtain monitoring data characterizing presence of hardware and software components on each of the IT assets 106. The asset state mapping logic 114 is configured to generate a state map characterizing (i) which of the hardware and software components were present on each of the IT assets 106 when installation of a given driver was attempted and (ii) whether installation of the given driver was successful on each of the IT assets 106. The driver installation failure prediction logic 116 is configured to determine, based at least in part on the state map, conditional probabilities of installation failure for the given driver associated with presence of respective ones of the hardware and software components. The driver installation control logic 118 is configured to identify hardware and software components present on an additional IT asset, and to control whether the given driver is installed on the additional IT asset based at least in part on the conditional probabilities of installation failure for the given driver associated with the identified hardware and software components present on the additional IT asset.

It is to be appreciated that the particular arrangement of the client devices 102, the IT infrastructure 105 and the driver update management system 110 illustrated in the FIG. 1 embodiment is presented by way of example only, and alternative arrangements can be used in other embodiments. As discussed above, for example, the driver update management system 110 (or portions of components thereof, such as one or more of the telemetry collection logic 112, the asset state mapping logic 114, the driver installation failure prediction logic 116, and the driver installation control logic 118) may in some embodiments be implemented internal to one or more of the client devices 102 and/or the IT infrastructure 105 (e.g., via host agents running on the client devices 102 and/or the IT assets 106 of the IT infrastructure 105).

At least portions of the telemetry collection logic 112, the asset state mapping logic 114, the driver installation failure prediction logic 116, and the driver installation control logic 118 may be implemented at least in part in the form of software that is stored in memory and executed by a processor.

The driver update management system 110 and other portions of the information processing system 100, as will be described in further detail below, may be part of cloud infrastructure.

The driver update management system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the support database 108 and the driver update management system 110 or components thereof (e.g., the telemetry collection logic 112, the asset state mapping logic 114, the driver installation failure prediction logic 116, and the driver installation control logic 118) may be implemented on respective distinct processing platforms, although numerous other arrangements are possible. For example, in some embodiments at least portions of the driver update management system 110 and one or more of the client devices 102, the IT infrastructure 105 and/or the support database 108 are implemented on the same processing platform. A given client device (e.g., 102-1) can therefore be implemented at least in part within at least one processing platform that implements at least a portion of the driver update management system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the support database 108 and the driver update management system 110, or portions or components thereof, to reside in different data centers. Numerous other distributed implementations are possible. The driver update management system 110 can also be implemented in a distributed manner across multiple data centers.

Additional examples of processing platforms utilized to implement the driver update management system 110 and other components of the information processing system 100 in illustrative embodiments will be described in more detail below in conjunction with FIGS. 10 and 11.

It is to be appreciated that these and other features of illustrative embodiments are presented by way of example only, and should not be construed as limiting in any way.

It is to be understood that the particular set of elements shown in FIG. 1 for controlling installation of drivers based on hardware and software components present on IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
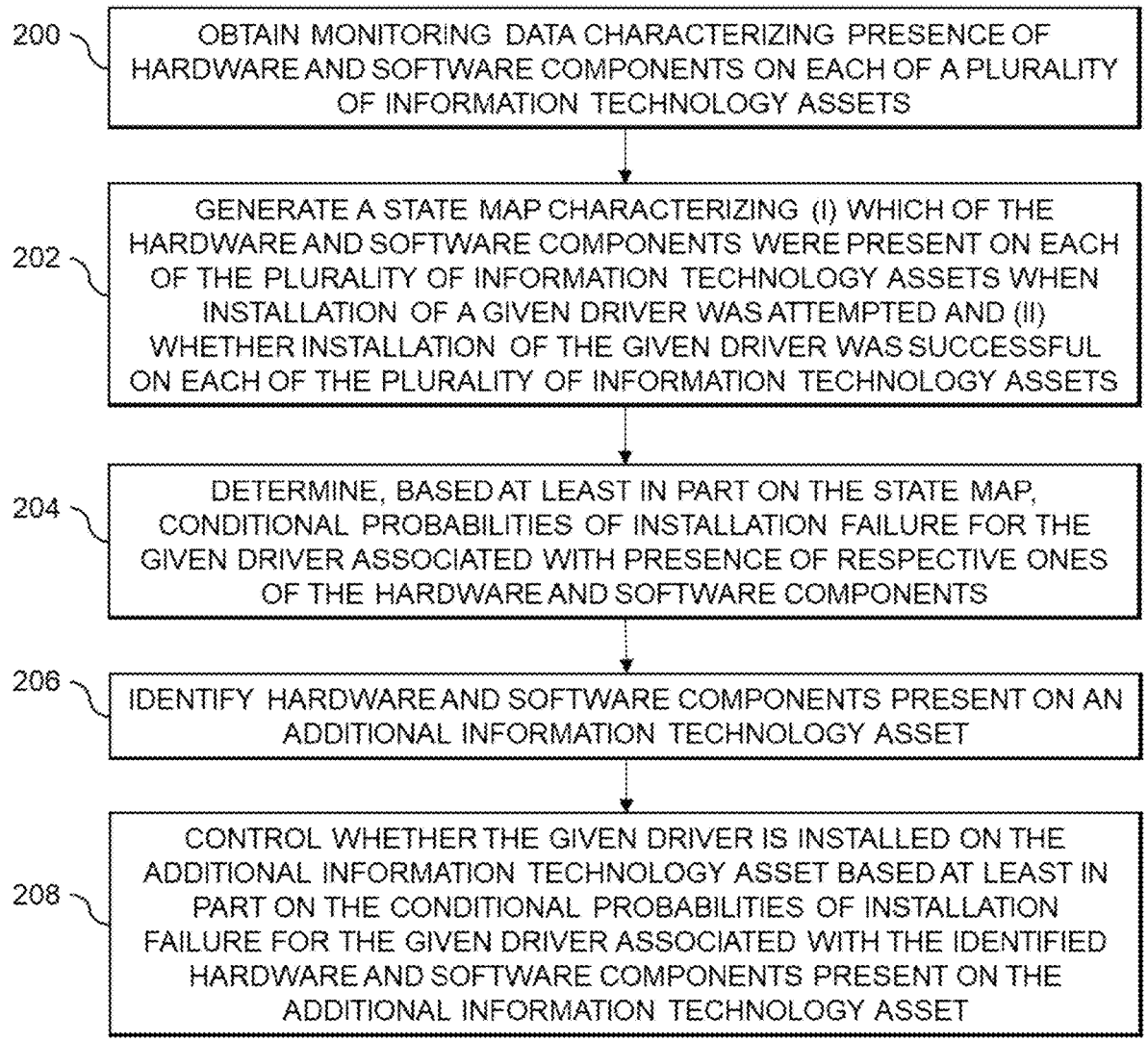
FIG. 2 is a flow diagram of an exemplary process for controlling installation of drivers based on hardware and software components present on information technology assets in an illustrative embodiment.

An exemplary process for controlling installation of drivers based on hardware and software components present on IT assets will now be described in more detail with reference to the flow diagram of FIG. 2. It is to be understood that this particular process is only an example, and that additional or alternative processes for controlling installation of drivers based on hardware and software components present on IT assets may be used in other embodiments.

In this embodiment, the process includes steps 200 through 208. These steps are assumed to be performed by the driver update management system 110 utilizing the telemetry collection logic 112, the asset state mapping logic 114, the driver installation failure prediction logic 116, and the driver installation control logic 118. The process begins with step 200, obtaining monitoring data characterizing presence of hardware and software components on each of a plurality of IT assets (e.g., IT assets 106 of the IT infrastructure 105). The monitoring data characterizing presence of the hardware and software components on a given one of the plurality of IT assets may comprise a list of installed drivers for the hardware components of the given IT asset, and a list of installed software on the given information technology asset. The monitoring data obtained in step 200 may further characterize one or more additional state features of each of the plurality of information technology assets, the one or more additional state features comprising resource utilization information, a battery status, etc.

A state map is generated in step 202, the state map characterizing (i) which of the hardware and software components were present on each of the plurality of IT assets when installation of a given driver was attempted and (ii) whether installation of the given driver was successful on each of the plurality of IT assets. The monitoring data for the hardware components of a given one of the plurality of IT assets may comprise a first set of datasets obtained in accordance with a first collection and reporting schedule and the monitoring data for the software components of the given IT asset may comprise a second set of datasets obtained in accordance with a second collection and reporting schedule different than the first collection and reporting schedule. The state map may utilize, for the given IT asset, one of the first set of datasets obtained in accordance with the first collection and reporting schedule nearest in time to a time that installation of the given driver was attempted on the given IT asset and one of the second set of datasets obtained in accordance with the second collection and reporting schedule nearest in time to the time that installation of the given driver was attempted on the given IT asset. The state map for the given IT asset may comprise a one-hot encoded list of the hardware and software components present on the given IT asset for each of one or more timestamps.

In step 204, conditional probabilities of installation failure for the given driver associated presence of respective ones of the hardware and software components are determined based at least in part on the state map generated in step 202. Step 204 may utilize a Bayesian machine learning algorithm. The Bayesian machine learning algorithm may consider that the conditional probability of installation failure given presence of one of the hardware and software components is independent of presence of each other one of the hardware and software components. The Bayesian machine learning algorithm may utilize a Bernoulli event model where the conditional probability of installation failure of each of the hardware and software components is estimated utilizing a maximum likelihood estimation algorithm and a installation failure label probability for each of the hardware and software components which is approximated using class-wise distribution of each of the hardware and software components across the plurality of IT assets.

Hardware and software components present on an additional IT asset are identified in step 206. The FIG. 2 process continues with step 208, controlling whether the given driver is installed on the additional IT asset based at least in part on the conditional probabilities of installation failure for the given driver associated with the identified hardware and software components present on the additional IT asset. Step 208 may include estimating a probability of installation failure for the given driver on the additional IT asset based on a product of the conditional probabilities of installation failure for each of the identified hardware and software components present on the additional IT asset, and blocking installation of the given driver on the additional IT asset responsive to the estimated probability of installation failure for the given driver on the additional IT asset exceeding a designated threshold.

Driver updates support optimal computer hardware functions, and provide performance benefits and new features. The driver update process can sometimes end in failure, which corresponds to unrealized benefits from driver updates as well as potential machine performance issues, both of which are highly correlated with the number of service request (SR) counts. Vendors of computing devices and other types of IT assets, or enterprises which provide support for a set of managed IT assets, may partially manage the driver updates of a large number of IT assets (e.g., a single enterprise may manage or partially manage driver updates for approximately 200 million Windows computing devices). Driver updates may be managed through support software (e.g., Dell® SupportAssist) and various communication channels (e.g., Dell® Update, Dell® Command Update (DU/DCU) channels). The large number of driver updates results in a significant number of driver update failures, with associated support costs and suboptimal user experience. Various tools may be used by vendors or support enterprises to attempt to proactively block the installation of faulty drivers to prevent failures. Such tools may utilize failure rate threshold-based models which block driver updates for drivers which are considered failure prone (e.g., by using a driver catalog, by considering the driver catalog in combination with limited features such as IT asset platform and operating system (OS), etc.). While such tools may be at least partially effective, they operate at a high level and do not consider all interactions between software and hardware components of IT assets. Further, these tools fail to identify the root cause or reason for driver update failures.

Considering the large number (e.g., $2^n$) of possible hardware and software component combinations being utilized by individual customers or other end-users in the field, traditional deterministic driver-per-preconfigured-machine testing approaches and failure rate threshold-based models cannot fully isolate and capture the impact of individual hardware and software components, or combinations thereof, that have a high probability of causing driver installation failure.

Illustrative embodiments provide technical solutions which consider all possible interactions between hardware and software components of IT assets to identify plausible causes for driver installation failures. The technical solutions described herein utilize the identified causes to identify IT assets with a high probability of driver installation failure for one or more drivers, and proactively prevents the driver update process for such drivers on the identified IT assets.

Figure 3:
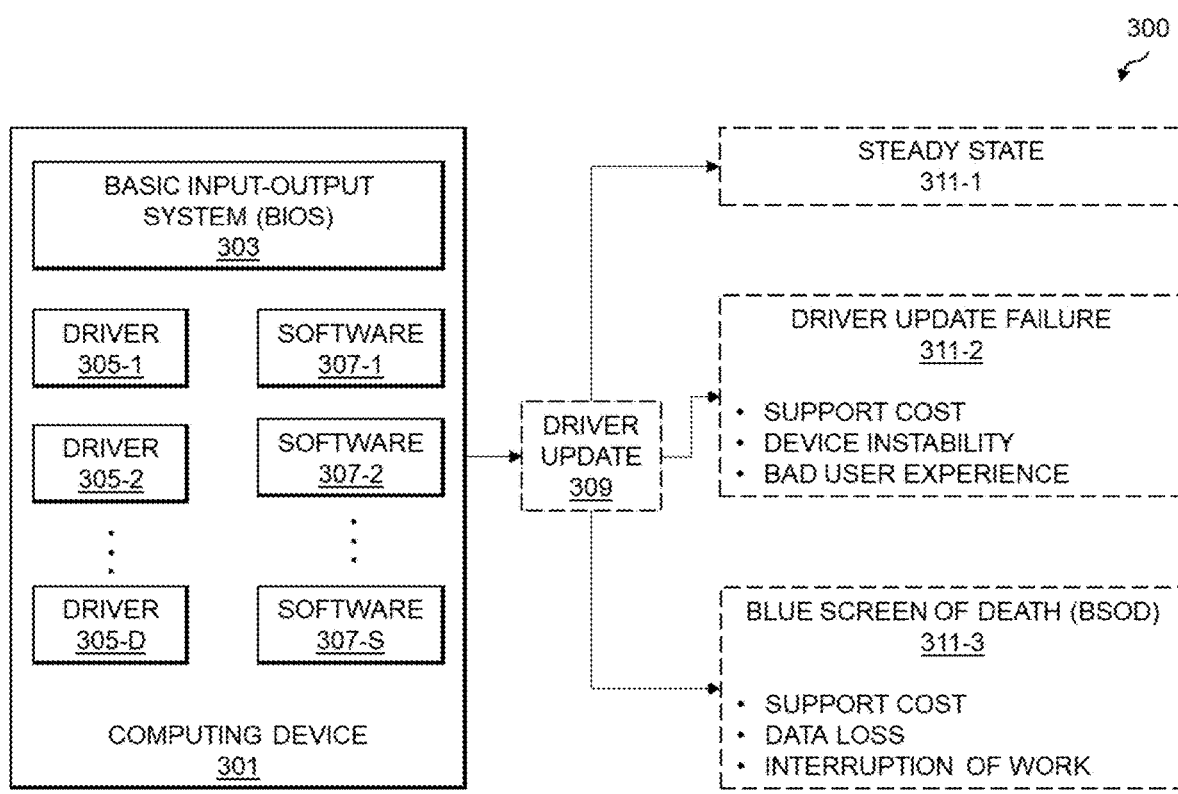
FIG. 3 shows possible outcomes of a driver update process for a computing device in an illustrative embodiment.

FIG. 3 shows an example 300 of possible outcomes for a driver update process for a computing device 301 (e.g., a laptop). Here, the computing device 301 has a platform including a basic input-output system (BIOS) 303, a set of drivers 305-1, 305-2, . . . 305-D (collectively, drivers 305), and a set of software 307-1, 307-2, . . . 307-S (collectively, software 307). The computing device 301 is assumed to be in a steady state, and a driver update process 309 is performed for one of the drivers 305. The driver update process 309 may result in different outcomes, such as the computing device 301 remaining in the steady state 311-1, the computing device 301 experiencing driver update failure 311-2, and the computing device 301 experiencing a blue screen of death (BSOD) 311-3. The driver update failure 311-2 may result in support cost, device instability, and bad user experience (e.g., performance issues, security concerns, suboptimal user experience and customer dissatisfaction). Similarly, the BSOD 311-3 may result in support cost, data loss and interruption of work in additional to the bad user experience.

Figure 4:
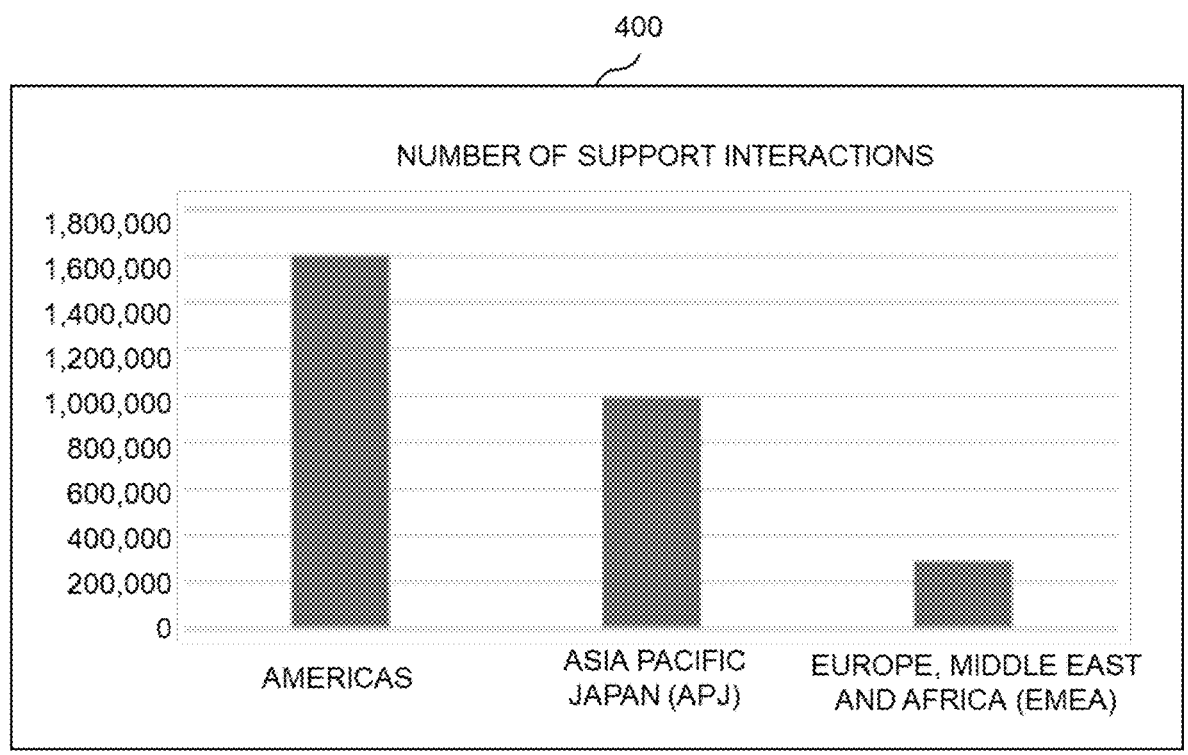
FIG. 4 shows a chart of the number of support interactions by region in an illustrative embodiment.
Figure 5:
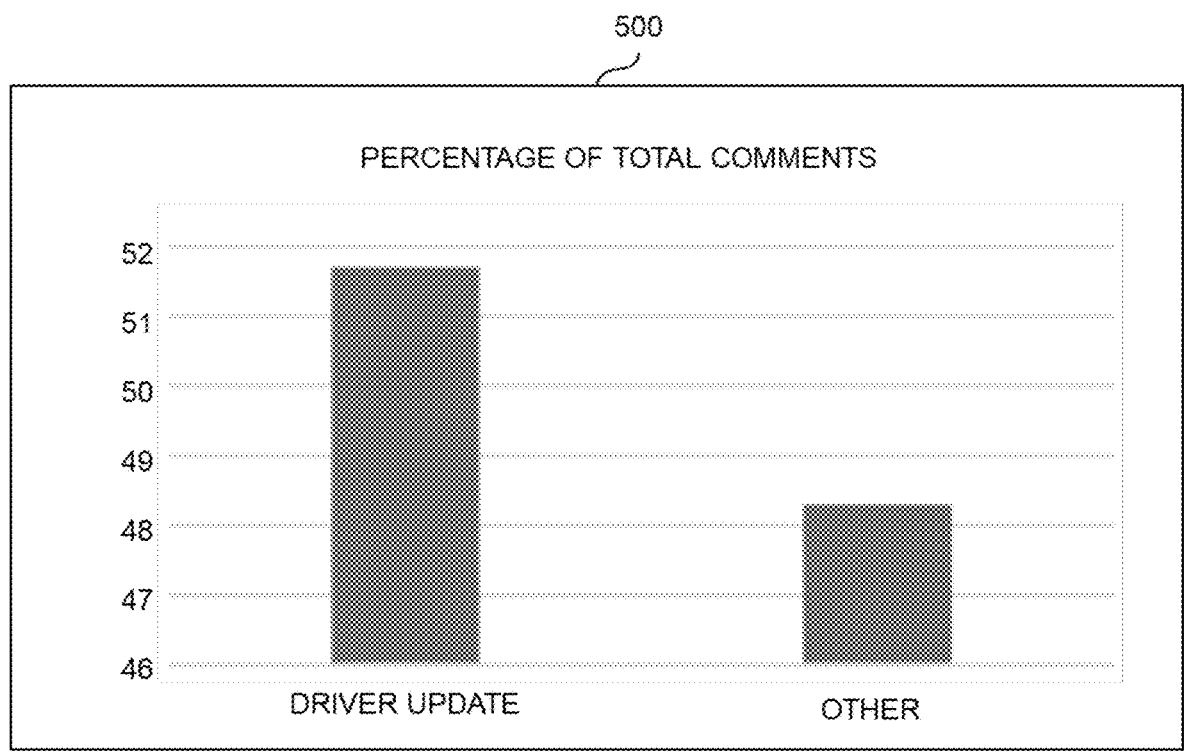
FIG. 5 shows a chart of the proportion of support interactions which are made for driver-related issues in an illustrative embodiment.

The scale and cost of driver update issues (e.g., driver update failure 311-2, BSOD 311-3, etc.) is reflected in the scale and proportion of support requests which are received for driver-related problems. FIG. 4 shows a chart 400 illustrating the number of support interactions for an enterprise, broken down by region (e.g., Americas, Asia Pacific Japan (APJ), Europe, Middle East and Africa (EMEA)). FIG. 5 shows a chart 500 illustrating the proportion of support interactions which are made for driver-related issues. Thus, it can be seen that driver-related issues are a significant driver of support interactions, across various regions. The problem of driver-related issues may be alleviated at least in part through quality control measures put in place by an enterprise which manages or provides support for IT assets (e.g., where such management or support includes managing driver updates for the IT assets). The quality control measures may be placed within various channels used for updating drivers on the managed IT assets.

The driver update process will now be described, including update channels which may be used by an enterprise, and quality control mechanisms which may be used for driver update processes as well as their interlocks. IT assets, such as laptops, may be shipped with support software (e.g., SupportAssist, DU/DCU software). Apart from other assigned tasks, the support software may be responsible for scheduling and monitoring driver updates for the IT assets. The process for driver updates may start with catalog generation services, which creates an initial driver catalog of new drivers available for their respective IT assets. The initial driver catalog is composed of pre-certified driver updates, which include drivers tested for the latest platforms to ensure the updates are safe for customers or other end-users. After generation of the initial driver catalog, software applications on the IT assets refer to the initial driver catalog to look for available driver updates and install them. The update process may be monitored by the support software, using telemetry data sent back by updating applications. In a catalog-based approach, such monitoring may be used to refine the initial driver catalog to create a dynamic curated driver catalog. An example of a dynamic curated driver catalog is the Bradbury driver catalog, which is maintained by the Bradbury solution.

Catalog-based approaches monitor the update process for all eligible IT assets, and remove the drivers that have installation failure rates higher than a set threshold. The dynamic curated driver catalog is updated over time as new data becomes available from the field. The blocking algorithm depends only on the installation failure rates of drivers, and does not consider the impact of external factors (e.g., installed OS, BIOS, etc.). The driver update process with a catalog-based approach can be summarized as: (1) catalog generation service creates an initial driver catalog of available drivers for update, validated by testing of drivers on limited IT assets; (2) the initial driver catalog is used as a starting point for a more dynamic curated driver catalog; (3) the driver update process is monitored on all eligible IT assets; (4) drivers with installation failure rates higher than a set threshold are removed or blocked in the dynamic curated catalog (e.g., drivers with installation failure rates higher than the set threshold may be blocked for update on the first "n" IT assets, where the value of "n" is set by IT support staff); and (5) the drivers in the dynamic curated driver catalog are no longer considered available for update on other eligible IT assets.

Catalog-based approaches are effective in preventing failures agnostic to the features of the IT assets. Drivers that fail with high rates, irrespective of IT asset configurations, are identified and stopped from causing further failures. The limitations of catalog-based approaches, however, may be observed in the table 600 of FIG. 6. The table 600 shows different driver identifiers (IDs) and platforms, along with associated installation counts, failure counts, failure rates, and the revision date of the drivers. As can be seen from the table 600, some drivers fail with high rates only for specific platforms. Blocking these drivers for other platforms is unnecessary as it stops them from obtaining otherwise beneficial updates. Similarly, some drivers fail with high rates only for specific combinations of drivers, platforms and OS. Some support software (e.g., such as SupportAssist utilizing a Smart Driver Update (SDU) version 1.5 model), can remedy this issue by blocking drivers while considering such interactions (e.g., with platform and OS).

Support software can be used to provide numerous value-added services, including but not limited to proactive and predictive issue remediation, health monitoring, data recovery, etc. In some cases, support software has different levels of entitlements, offering more services as entitlement level increases. One of the services which may be provided through support software is driver management. In some cases, when present on an IT asset, support software overrides existing driver update processes on the IT asset. For example, when SupportAssist is present on an IT asset, it may override the DU/DCU driver update process to handle the driver update process by itself. Support software, in its driver update process, may utilize a driver catalog (e.g., a dynamic curated driver catalog generated using a catalog-based approach as described above), and further improves upon the quality control process by adding its own blocking mechanism (e.g., a SDU model).

Figure 7:
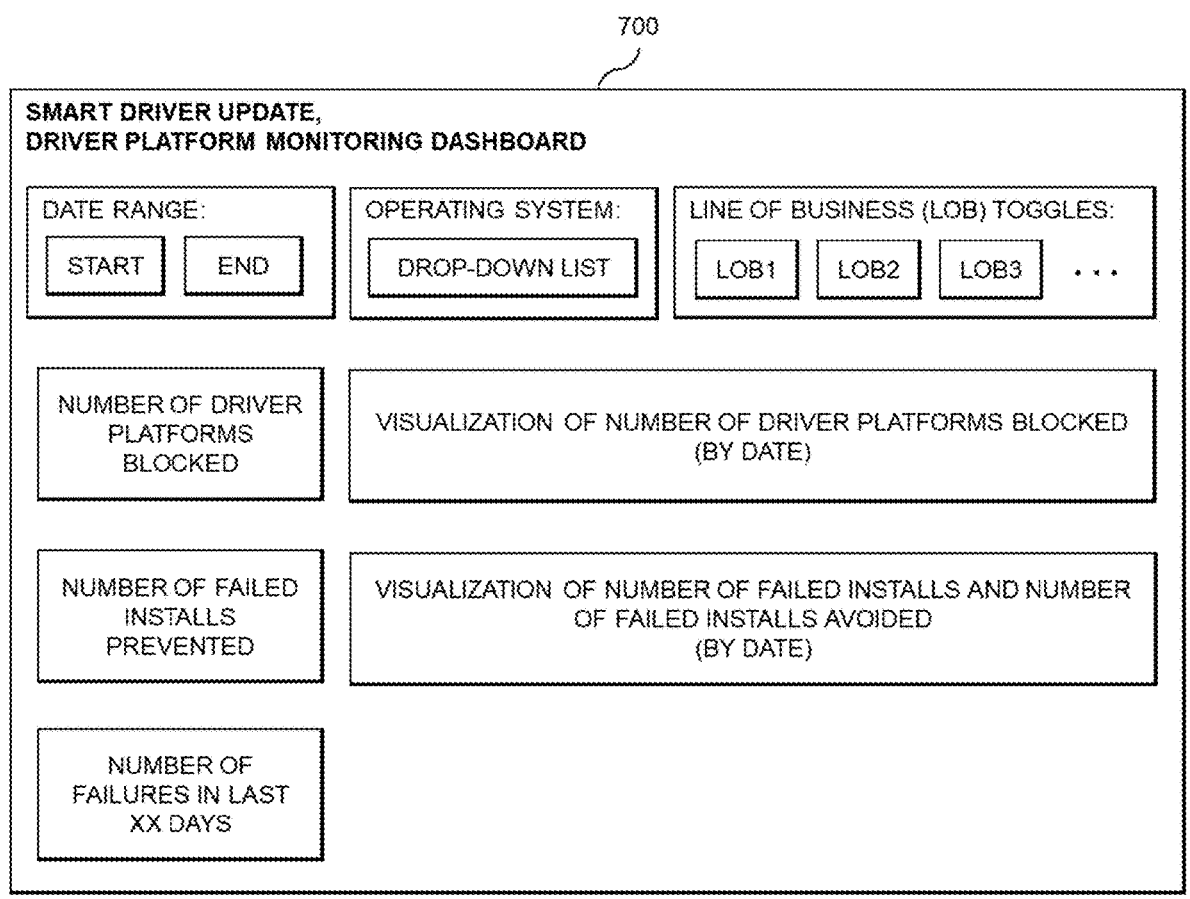
FIG. 7 shows a smart driver update driver platform monitoring dashboard interface in an illustrative embodiment.

SDU models may consider the effect of the platform and OS on driver installation failure. For example, if a driver B fails with a rate of Y % (e.g., which is higher than the set threshold of a dynamic curated catalog) for a specific platform and OS combination, then the SDU model would block driver B updates for IT assets with that specific platform and OS combination. The SDU model acts upon drivers that are already approved by a dynamic curated driver catalog. The SDU model can use the dynamic curated driver catalog to check for possible driver updates, and then cross-references them to check if a given driver should be updated for a specific platform and OS combination under consideration. FIG. 7 shows a SDU driver platform monitoring dashboard 700 (e.g., which may be implemented using SDUv1.5). As shown in FIG. 7, the SDU driver platform monitoring dashboard 700 includes features for selecting a date range, OS and one or more lines of business (LOBs). Based on such selections, the SDU driver platform monitoring dashboard 700 shows the numbers of driver platforms blocked, the number of failed installs prevented, and the number of failures in the last XX (e.g., 60) days, along with a visualization of the number of driver platforms blocked (e.g., by date) and a visualization of the number of failed installs and number of failed installs avoided (e.g., by date).

Even though SDU models may consider the effects of some features (e.g., platform and OS) which are correlated with driver installation failures, there are various other factors which may influence installation failures for drivers.

The technical solutions described herein provide a framework which considers multiple factors, such as the effects of all hardware and software components of IT assets on driver installation failures.

When failures occur during driver update installations, IT assets fail to benefit from new features or potential performance improvements associated with the driver updates. These failures could have a cumulative impact on machine performance and stability in the long run. Various approaches may be used to guard against driver installation failures, including (1) pre-certified driver updates, where internal teams test new driver updates on the latest platforms to ensure that driver updates are safe for IT assets; (2) customer or end-user contact, where customers or end-users contact a support or management enterprise to report driver installation failure issues after driver installation attempts and, when IT staff of the support or management enterprise identifies the failure-prone driver updates, those driver updates are banned and no longer available therefore preventing other customers or end-users of the support or management enterprise from experiencing similar failures; and (3) failure rate threshold-based models which monitor driver installation telemetry data and periodically update a blocklist of highly failure-prone driver updates.

Such approaches, however, suffer from various technical problems. One technical problem relates to component interaction and root-cause analysis, where driver install failures can be influenced by a myriad of factors beyond the quality of the driver itself. For example, interactions between hardware components, pre-existing drivers, and other software components can contribute to driver update failures. The testing and certification of driver stability are therefore constrained by the finite amounts of hardware-software configurations available in the testing environment, whereas the field contains a larger amount of hardware-software configurations in use, where the larger amount of hardware-software configurations is impractical to test in a lab setup. While existing SDU models can implicitly capture at least a portion of such interactions to a certain degree through estimating driver installation failure probabilities down to the basis of an individual driver per machine platform per OS version, existing SDU models are not capable of providing further insights into the effects of the presence or absence of machine components on the failure probabilities due to the inherent design of existing SDU models.

Another technical problem is that, although IT staff or tech agents of an enterprise can resolve driver install failures and ban failure-prone driver updates when customers contact the enterprise, this remediation is reactive in nature since it requires the customers to encounter issues in the first place. The benefit of the remediation doesn't reach the broader customer base until there is already a critical mass of issue-encountering customers. Service calls and associated service costs due to driver installation-related failures can negatively impact both customer experience with an enterprise's product as well as the enterprise's bottom line.

The technical solutions described herein not only monitor driver behavior on platforms with hardware-software configurations outside of a limited testing environment, but also systematically track driver updates and potential driver installation failures along with the state of the IT assets immediately prior to instances of driver installation successes and failures, and identify failure-triggering ones of the hardware and/or software components. In addition, instead of reactively remediating a customer's driver installation failure problems based on post-installation consumer contacts, the technical solutions described herein provide an early warning system which proactively identifies failure-prone driver updates and blocks them once the algorithm predicts that likely future failure will occur, thus eliminating the need for customer-initiated contacts in the first place.

In some embodiments, a state map creation technique is utilized which provides a novel method of feature generation utilized for modeling the driver installation process. The technical solutions in some embodiments further utilize a Bayesian algorithm to calculate the probability of driver installation failure of a given driver for specific IT assets.

Feature generation and driver state mapping will now be described. The state map X for modeling installation of a given driver is described with the following formulation:

$$X \in R^{m \times n}$$

where m is the number of machines or IT assets that tried installing the driver (e.g., agnostic of outcome), and n is the number of unique components (e.g., hardware and software) between the m devices. X is composed of vectors:

$$X = [F_1, F_2, \ldots, F_n]$$

where each vector $F \in I^{m \times 1}$ represents an individual hardware or software component feature in the state map for the m devices under consideration such that, for the ith (out of n) component:

$$F_i = [f_{1i}, f_{2i}, \ldots, f_{mi}]$$

where $f_{ki} \to \{0,1\}$ indicates the absence ($\{0\}$) or presence ($\{1\}$) of the ith component for the kth machine or IT asset.

The final dataset is created using two data sources which may have different collection and reporting schedules. A support software dataset reports the success or failure of the driver installation process for each IT asset, and is considered as the fixed point on the timeline, from which a search backwards is performed to find the closest (in time) data collection (e.g., from Dell® Data Vault (DDV)), which reports the list of software and hardware components for each IT asset. This process is mathematically described below. Let $T0 \in T^{m \times 1}$ be the vector containing the driver installation outcome timestamp for the m devices under consideration for the given driver. Given this, then:

$$Y = Y_{T0}$$

$$Y \in I^{m \times 1}$$

is the Boolean vector containing the outcome of the driver install process for the m IT assets. Let $T_i^{a_i \times 1}$ be a variable dimension $(a_i)$ vector containing the timestamps for all data collections for the ith IT asset. The optimal data collection timestamp for the ith IT asset is thus given by:

$$T_i^* = T_{ik} | k = \mathrm{argmin}_{z \to [1, a_i]}(sup(0, (T0_i - T_{iz})))$$

For the ith IT asset, the feature set $X_i$ is the one-hot encoded list of software and hardware components on that IT asset at collection timestamp $T_i^*$, with a maximum dimension of n, where n is the length of the set of unique components amongst the m IT assets.

The modeling of driver installation failures, given hyper-personalized asset state map-based features, is approached by considering that each feature (e.g., of hardware and software components of a computing device or other IT asset) used in the model is essentially independent. For example, say the use of a particular OS (e.g., Windows 10) as a given PC's OS is independent (e.g., without any statistical correlation) with the use of a particular graphics card (e.g., Nvidia RTX 2080) as the given PC's graphical processing unit (GPU). The adoption of this assumption, though indeed naïve by real-world standards yet remaining theoretically permissible, has frequently proven to be pragmatic performance-wise. The feature-wise independence as part of the theoretical foundation allows for simplification of the formulation of the posterior probability as described below.

Let $Y \in \{0,1\}^m$ be the labels indicating success (y=0) or failure (y=1) outcomes of driver installation events. Again, let $X \in R^{m \times n}$ be the features representing a hardware and software configuration state map of a given IT asset at the time of the driver installation event represented by Y, where $X=[F_1, F_2, \ldots, F_n]$. The probability of driver installation failure given a state map, from the Bayesian perspective, is given by:

$$P(Y|X) = \frac{P(Y) * P(X|Y)}{P(X)}$$

where P(X) can be considered a constant, and therefore:

$$P(Y|X) \propto P(Y) * P(X|Y) = P(F_1, \ldots, F_n, Y)$$

By the chain rule which expresses the joint distribution of multiple features by their respective conditional probabilities, this may be represented as:

$$P(F_1, \ldots, F_n, Y) = P(F_1|F_2, \ldots, F_n, Y) * P(F_2, F_3 \ldots, F_n, Y)$$
$$= P(F_1|F_2, \ldots, F_n, Y) * P(F_2|F_3 \ldots, F_n, Y) * P(F_3 \ldots, F_n, Y)$$
$$= \ldots$$
$$= P(F_1|F_2, \ldots, F_n, Y) * \ldots * P(F_{n-1}|F_n, Y) * P(F_n|Y) * P(Y)$$

If mutual independence between the features $F_1, \ldots, F_n$ is assumed, then $$P(F_1|F_2, \ldots, F_n, Y) * \ldots * P(F_{n-1}|F_n, Y) * P(F_n|Y) * P(Y) = P(F_1|Y) * P(F_2|Y) * \ldots * P(F_n|Y) * P(Y)$$

and therefore $$P(Y|X) \propto P(Y) * \prod_{i=1}^{n} P(F_i|Y)$$

Under the assumption of a Bernoulli event model where p denotes the feature probabilities which can be estimated through a maximum likelihood estimation (MLE) algorithm, and theta (θ) denotes the label probability which can be approximated using the label's class-wise distribution in the sample, then:

$$P(Y=y) = \theta^y (1-\theta)^{1-y}$$
$$P(F_i=f_i|Y) = p_i^{f_i}(1-p_i)^{1-f_i}$$

and therefore:

$$P(Y=y|F_1=f_1, \ldots, F_n=f_n) \propto \theta^y (1-\theta)^{1-y} \prod_{i=1}^{n} p_i^{f_i}(1-p_i)^{1-f_i}$$

Finally, for the classification task, the following equation may be used for estimating the probability of driver installation failure of a specific driver for an IT asset with a set of hardware and software components:

$$P(Y=y|F_1, \ldots, F_k) = P(F_1|y) * P(F_2|y) * \ldots * P(F_k|y) * P(y)$$

The technical solutions described herein provide a novel state-mapping approach, as well as root-cause determination capabilities and the ability to generate hyper-personalized predictions for individual IT assets. Through the formulations above, for a given IT asset where telemetry data is collected, state maps that capture the given IT asset's hardware and software inventory (e.g., all installed drivers, BIOS, user-installed applications, etc.) can be used to represent the comprehensive state of the given IT asset. For example, given events of interest (e.g., including but not limited to driver installation outcomes according to data collected by SupportAssist or other support software), the technical solutions link multiple large-scale telemetry datasets (e.g., including but not limited to DDV or other telemetry data) to create an approximate state map of IT assets which can be used to analyze the effect of individual components on the events, enabling correlation analysis and isolation of important features.

Figure 8A:
Figure 8B:

When the telemetry collection cadence is sufficiently high and robust providing sufficient information about the IT assets, the state map table or other data structure created using the technical solutions described herein allows for close examination of any changes to the IT assets over time as well as potentially serving as the jumping-off point for a myriad of subsequent analytical options depending on business needs. FIG. 8A shows a table 800 of hardware telemetry data which may be collected from different IT assets (e.g., associated with different service tags), and FIG. 8B shows a table 805 of software telemetry data which may be collected from different IT assets (e.g., associated with different service tags). As can be seen, the times at which the hardware and software telemetry data are collected may differ. FIG. 8C shows a state map 810 showing, for different times of interest (e.g., driver install failure events), the time of nearest prior collection of telemetry data (e.g., both for hardware and software telemetry data) for different IT assets (e.g., associated with different service tags) having different hardware and software states. This novel mapping solution may be applied for various other state features (e.g., beyond hardware and software components), such as battery usage, central processing unit (CPU) utilization, and various machine performance attributes as well as time series data for OS alerts, etc. Such other state features could be added to the state map to enable further modeling of these features, depending on specific use case requirements.

The technical solutions described herein may also be used for component level root-cause analysis. As discussed above, given m IT assets that together have n unique hardware and software components that try to install a specific driver, for each component the probability of installation failure or success may be estimated, given that a specific component (or set of components) is on that IT asset. The conditional probability $P(F_i|y=1)$ that a component i is present on an IT asset, given that installation failure occurs for the driver under consideration, can be learned through machine learning as described above. The technical solutions can isolate k components that, if present together on an IT asset, would result in a very high probability of failure (e.g., according to some designated threshold, such as a 0.99 probability threshold) using the following equation:

$$P(F_1|y) * P(F_2|y) * \ldots * P(F_k|y) * P(y) \geq \text{threshold}$$

where y=1 and the value of threshold may be user-configured. These components together represent factors that collectively may explain the majority of installation failures for the driver under consideration, and can be treated as root-causes of driver installation failures. The components isolated through this process can be communicated to driver development teams for further analysis.

The technical solutions described herein can further be used to provide hyper-personalized predictions. For a given driver with attempted installation on m IT assets with a total of n unique hardware and software components, the technical solutions can identify k components that together can explain the threshold (e.g., 99%) probability of installation failure for the driver under consideration. Given the identified k components, the probability of installation failure of the driver on any IT asset may be estimated. Consider, for a given driver, that z out of the k identified components are present on a given IT asset. The probability of installation failure of the given driver on the given IT asset may be estimated according to:

$$P(F_1|y=1) * P(F_2|y=1) * \ldots * P(F_z|y=1) * P(y=1) = P(y=1)$$

Given the failure probability estimated by the equation above, and a threshold (e.g., to be decided by evaluating the tradeoffs and business requirements, which may be set as 0.4), the technical solutions can predict if the driver installation attempt will fail on the given IT asset and actively block the driver installation process if it is, hence making a personalized prediction for the given IT asset.

Different aspects of the technical solutions described herein will now be described with respect to an example use case, including example input data and a state map created for a set of IT assets, followed by prediction performance output of the model for different drivers, and estimating the probabilities of failure associated with specific components for a given driver.

The data sets used to create the state map may be obtained from telemetry data collection. Despite being divided into various subsets by properties of the features (e.g., base system hardware components, OS, BIOS, etc., user-installed applications, and already-installed drivers), the features share a similar table format such that they are all ever-growing lists of results from past scans of individual IT assets. Using the application telemetry as an example, prior to being processed by the state mapping solutions described herein, each row may include main features that are relevant to user applications. Within a particular telemetry collection subset (e.g., as partitioned by the collection data feature), only one application's information is listed. Therefore, for one IT asset that has N applications installed (e.g., under an assumption that no additional application is installed between each data collection time), each collection or scan of the IT asset will return N rows to cover these applications' details. This means that, at the time of each data collection, the dataset will be appended with N*A rows, with A being the number of total active IT assets, and the total size will be C*N*A, with C being the total number of data collections which have occurred (e.g., depending on data collection cadence settings).

Figure 9B:
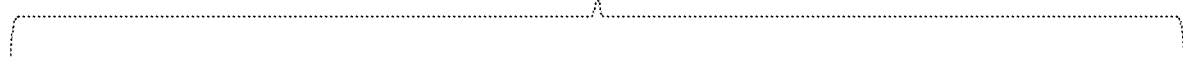

Despite relying on large input with repetition in the collected data, the state map algorithm can pinpoint the information in each dataset that is most relevant to each timestamp of events on each IT asset, resulting in new features that are not only much simplified and coherent, but are also machine learning modeling ready and training efficient. FIG. 9A shows a support information data value table 900 of support information collected from different system types, with different motherboard piece part identifiers (PPIDs), BIOS versions, processors and video controllers. FIG. 9B shows an asset state map snapshot 905 for a given IT asset, which includes a features table (e.g., with timestamp, service tag, driver ID, platform and OS version features of the given IT asset), a state label table (e.g., indicating whether driver installation was successful for the given IT asset), a driver name list (e.g., of installed drivers on the given IT asset), and an application name list (e.g., of installed applications on the given IT asset).

Figure 9D:
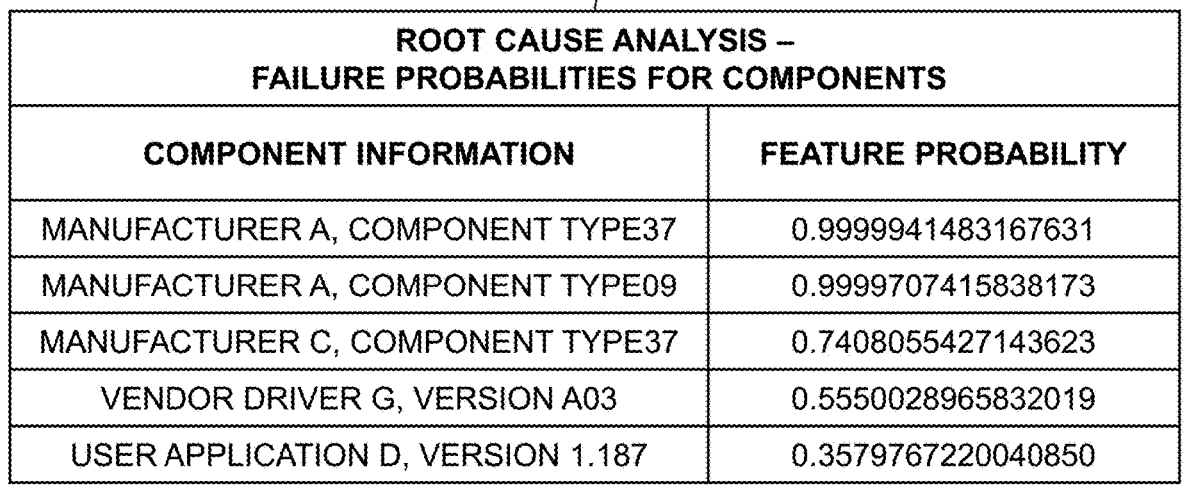

With the state map features engineered, a machine learning modeling algorithm is applied to derive driver-wise binary classification models to predict installation failures based on asset-level hardware and software components. FIG. 9C shows a table 910 of performance scores indicating the model predictive power for different drivers. Experimental model performance overall falls between 0.6 and 0.9 Area Under the Receiver Operating Characteristic Curve (AUROC) scores, indicating predictive power ranging from what can be qualitatively considered as reasonably present to excellent. FIG. 9D shows a table 915 showing how individual feature components' likelihood of presence can be used for root cause analysis (e.g., to determine driver installation failure probabilities for different components).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling installation of drivers based on hardware and software components present on IT assets will now be described in greater detail with reference to FIGS. 10 and 11. Although described in the context of system 100, these platforms may also be used to implement at least portions of other information processing systems in other embodiments.

Figure 10:
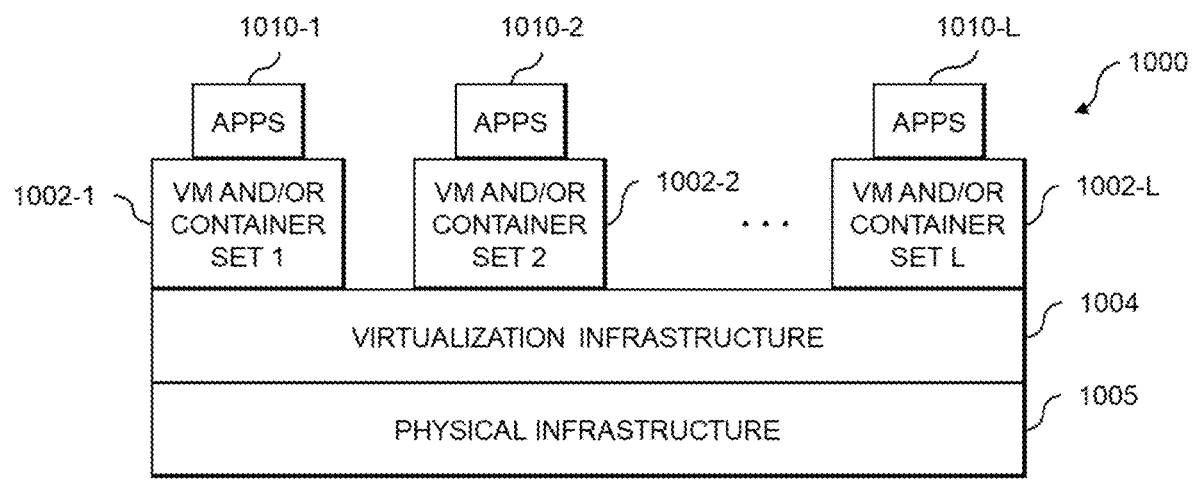
FIGS. 10 and 11 show examples of processing platforms that may be utilized to implement at least a portion of an information processing system in illustrative embodiments.
Figure 11:
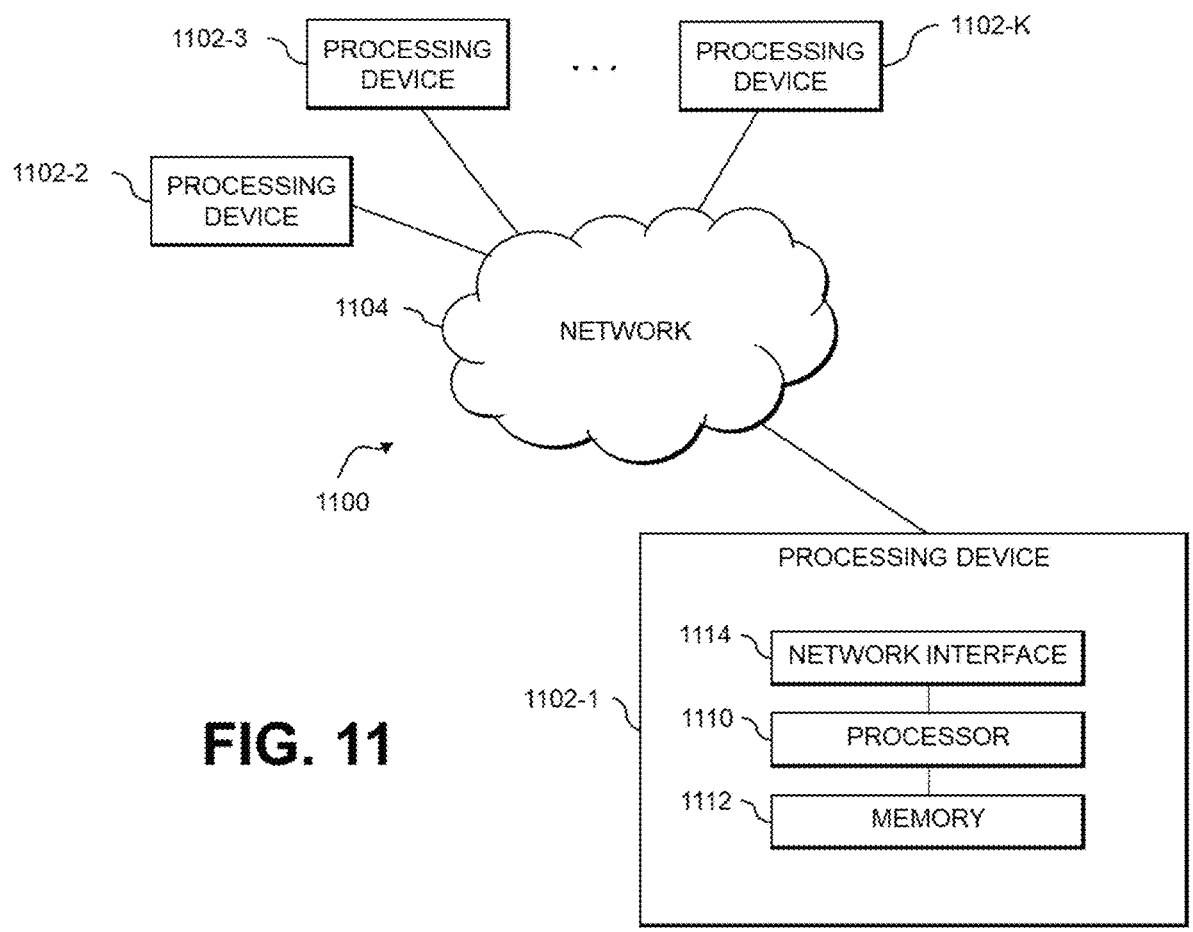

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling installation of drivers based on hardware and software components present on IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, state information, machine learning algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to obtain monitoring data characterizing presence of hardware and software components on each of a plurality of information technology assets;
to generate a state map characterizing (i) which of the hardware and software components were present on each of the plurality of information technology assets when installation of a given driver was attempted and (ii) whether installation of the given driver was successful on each of the plurality of information technology assets;
to determine, based at least in part on the state map, conditional probabilities of installation failure for the given driver associated with presence of respective ones of the hardware and software components, wherein the conditional probabilities are determined based at least in part on class-wise distributions of installation failure labels for each of the hardware and software components across the plurality of information technology assets;
to identify hardware and software components present on an additional information technology asset;
to determine a probability of installation failure for the given driver on the additional information technology asset based at least in part on a combination of the conditional probabilities of installation failure for each of the identified hardware and software components present on the additional information technology asset; and
to control whether the given driver is installed on the additional information technology asset based at least in part on the determined probability of installation failure for the given driver on the additional information technology asset.

2. The apparatus of claim 1 wherein the plurality of information technology assets comprise at least one of physical and virtual computing resources of an information technology infrastructure.

3. The apparatus of claim 1 wherein the monitoring data characterizing presence of the hardware and software components on a given one of the plurality of information technology assets comprises a list of installed drivers for the hardware components of the given information technology asset.

4. The apparatus of claim 1 wherein the monitoring data characterizing presence of the hardware and software components on a given one of the plurality of information technology assets comprises a list of installed software on the given information technology asset.

5. The apparatus of claim 1 wherein the monitoring data further characterizes one or more additional state features of each of the plurality of information technology assets, the one or more additional state features comprising resource utilization information.

6. The apparatus of claim 1 wherein the monitoring data further characterizes one or more additional state features of each of the plurality of information technology assets, the one or more additional state features comprising a battery status.

7. The apparatus of claim 1 wherein the monitoring data for the hardware components of a given one of the plurality of information technology assets comprises a first set of datasets obtained in accordance with a first collection and reporting schedule and the monitoring data for the software components of the given information technology asset comprises a second set of datasets obtained in accordance with a second collection and reporting schedule different than the first collection and reporting schedule.

8. The apparatus of claim 7 wherein the state map utilizes, for the given information technology asset:
one of the first set of datasets obtained in accordance with the first collection and reporting schedule nearest in time to a time that installation of the given driver was attempted on the given information technology asset; and
one of the second set of datasets obtained in accordance with the second collection and reporting schedule nearest in time to the time that installation of the given driver was attempted on the given information technology asset.

9. The apparatus of claim 1 wherein the state map for a given one of the plurality of information technology assets comprises a one-hot encoded list of the hardware and software components present on the given information technology asset for each of one or more timestamps.

10. The apparatus of claim 1 wherein determining the conditional probabilities of installation for the given driver associated with the presence of respective ones of the hardware and software components comprises utilizing a Bayesian machine learning algorithm.

11. The apparatus of claim 10 wherein the Bayesian machine learning algorithm considers that the conditional probability of installation failure given presence of one of the hardware and software components is independent of presence of each other one of the hardware and software components.

12. The apparatus of claim 10 wherein the Bayesian machine learning algorithm utilizes a Bernoulli event model where the conditional probability of installation failure of each of the hardware and software components is estimated utilizing a maximum likelihood estimation algorithm and the class-wise distributions of the installation failure labels for each of the hardware and software components.

13. The apparatus of claim 1 wherein determining the probability of installation failure for the given driver on the additional information technology asset is based at least in part on a product of the conditional probabilities of installation failure for each of the identified hardware and software components present on the additional information technology asset.

14. The apparatus of claim 13 wherein controlling whether the given driver is installed on the additional information technology asset comprises blocking installation of the given driver on the additional information technology asset responsive to the determined probability of installation failure for the given driver on the additional information technology asset exceeding a designated threshold.

15. A computer program product comprising a non-transitory processor-readable storage medium having stored therein program code of one or more software programs, wherein the program code when executed by at least one processing device causes the at least one processing device:
to obtain monitoring data characterizing presence of hardware and software components on each of a plurality of information technology assets;

to generate a state map characterizing (i) which of the hardware and software components were present on each of the plurality of information technology assets when installation of a given driver was attempted and (ii) whether installation of the given driver was successful on each of the plurality of information technology assets;

to determine, based at least in part on the state map, conditional probabilities of installation failure for the given driver associated with presence of respective ones of the hardware and software components, wherein the conditional probabilities are determined based at least in part on class-wise distributions of installation failure labels for each of the hardware and software components across the plurality of information technology assets;

to identify hardware and software components present on an additional information technology asset;

to determine a probability of installation failure for the given driver on the additional information technology asset based at least in part on a combination of the conditional probabilities of installation failure for each of the identified hardware and software components present on the additional information technology asset; and to control whether the given driver is installed on the additional information technology asset based at least in part on the determined probability of installation failure for the given driver on the additional information technology asset.

16. The computer program product of claim 15 wherein determining the probability of installation failure for the given driver on the additional information technology asset is based at least in part on a product of the conditional probabilities of installation failure for each of the identified hardware and software components present on the additional information technology asset.

17. The computer program product of claim 16 wherein controlling whether the given driver is installed on the additional information technology asset comprises blocking installation of the given driver on the additional information technology asset responsive to the determined probability of installation failure for the given driver on the additional information technology asset exceeding a designated threshold.

18. A method comprising:
obtaining monitoring data characterizing presence of hardware and software components on each of a plurality of information technology assets;

generating a state map characterizing (i) which of the hardware and software components were present on each of the plurality of information technology assets when installation of a given driver was attempted and (ii) whether installation of the given driver was successful on each of the plurality of information technology assets;

determining, based at least in part on the state map, conditional probabilities of installation failure for the given driver associated with presence of respective ones of the hardware and software components, wherein the conditional probabilities are determined based at least in part on class-wise distributions of installation failure labels for each of the hardware and software components across the plurality of information technology assets;

identifying hardware and software components present on an additional information technology asset;

determining a probability of installation failure for the given driver on the additional information technology asset based at least in part on a combination of the conditional probabilities of installation failure for each of the identified hardware and software components present on the additional information technology asset; and controlling whether the given driver is installed on the additional information technology asset based at least in part on the determined probability of installation failure for the given driver on the additional information technology asset;

wherein the method is performed by at least one processing device comprising a processor coupled to a memory.

19. The method of claim 18 wherein determining the probability of installation failure for the given driver on the additional information technology asset is based at least in part on a product of the conditional probabilities of installation failure for each of the identified hardware and software components present on the additional information technology asset.

20. The method of claim 19 wherein controlling whether the given driver is installed on the additional information technology asset comprises blocking installation of the given driver on the additional information technology asset responsive to the determined probability of installation failure for the given driver on the additional information technology asset exceeding a designated threshold.

* * * * *